United States Patent Office 3,530,118
Patented Sept. 22, 1970

3,530,118
PROCESS FOR THE SELECTIVE SATURATION OF DOUBLE BONDS IN STEROIDS
Georg Anner, Basel, and Peter Wieland, Oberwil, Basel-Land, Switzerland, assignors to Ciba Corporation, New York, N.Y., a corporation of Delaware
No Drawing. Filed July 18, 1968, Ser. No. 745,676
Claims priority, application Switzerland, July 28, 1967, 10,713/67
Int. Cl. C07c *169/00*
U.S. Cl. 260—239.55                  13 Claims

ABSTRACT OF THE DISCLOSURE

A new method for selectively saturating the 1,2-double bond of a $\Delta^{1,4}$-3-oxosteroid-diene is based on the finding that when a radical anion is caused to react on the $\Delta^{1,4}$-3-oxo-steroid-diene at a low temperature there is obtained a steroid anion of the partial formula

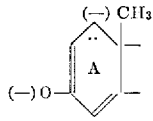

which on protonization at a low temperature affords the corresponding $\Delta^4$-3-oxo-steroid.

BACKGROUND OF THE INVENTION

Various methods are already known for saturating the 1,2-double bond in a $\Delta^{1,4}$-steroid-diene of the general partial formula of the ring A

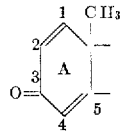

leading to the formation of the corresponding $\Delta^4$-3-oxo-steroid-monoene. According to one of these methods, for example, the $\Delta^{1,4}$-3-oxosteroid-diene is reduced with lithium in liquid ammonia, for example in the presence of tetrahydrofuran. According to another method catalytic hydrogenation with noble metal catalysts, for example palladium, is carried out. However, in these two processes the formation of the desired $\Delta^4$-steroid-monoene is always accompanied by the formation of varying amounts of the corresponding steroid completely saturated in the ring A so that the $\Delta^4$-steroid-monoene must be separated from the reduction mixture, which often involves difficulties.

Also sodium borohydride has been used for the selective saturation of the 1,2-double bond of a $\Delta^{1,4}$-3-oxo-steroid-diene, but this method gives poor yields. Moreover, the 3-oxo group is reduced to the hydroxyl group so that it is always necessary to follow up with a dehydrogenation of the process product to reoxidize the 3-hydroxyl group.

Finally, there should be mentioned the selective hydrogenation in the homogeneous phase with triphenylphosphine-rhodium chloride catalyst but with this process it has proved difficult in some cases, for example when hydrogenating 3-oxo-11α-acetoxy- or 3,11-dioxo-20-ethylenedioxy-$\Delta^{1,4}$-pregnadiene, to stop the reduction at the monoene stage so that, in this case, too, mixtures of monoene and steroid completely saturated in ring A are formed. In addition, there is the difficulty of the regeneration of the expensive rhodium catalyst so that this process too must be deemed to be unsatisfactory.

SUMMARY OF THE INVENTION

The present invention provides a new process whereby the 1,2-double bond of a $\Delta^{1,4}$-3-oxosteroid-diene can be selectively saturated with hydrogen in a smooth reaction and with a good yield. It is characterized in that a $\Delta^{1,4}$-3-oxosteroid-diene is treated in an aprotic solvent at a low temperature with an agent containing radical anions and the resulting reaction product, which contains the steroid anion of the partial formula

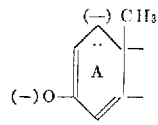

of the ring A, is protonized at a low temperature.

SPECIFIC EMBODIMENTS OF THE INVENTION

The new process of the present invention can be illustrated by the following scheme of partial formulae

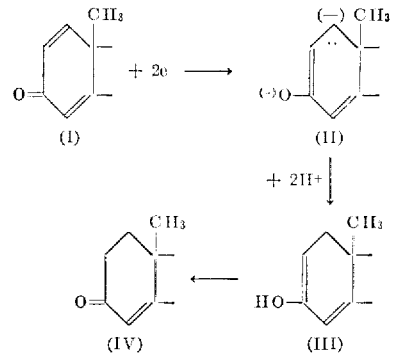

The two electrons appearing in the above scheme are supplied by the said agent containing radical anions. Such an agent is in the first place the reaction product obtained by reacting an alkali metal upon a polycyclic, aromatic hydrocarbon in an aprotic solvent. In this reaction there are formed one mol of the radical anion corresponding to the hydrocarbon concerned, per mol of alkali metal. As can be seen from the reaction scheme it should be necessary to use in this case theoretically two mol equivalents of alkali metal to ensure a maximum reaction of (I) to furnish (II). In practice, however, it is preferred to work with an excess. The aromatic hydrocarbon is likewise used in excess, though theoretically even catalytic proportions thereof would suffice.

Since the anion (II) has, especially at an elevated temperature, the tendency to decompose according to the following scheme:

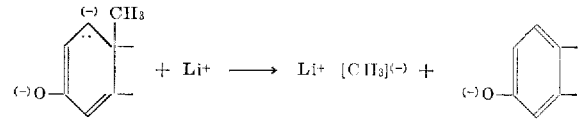

its formation, for example as described above from the steroid used as starting material with an alkali metal and a polycyclic aromatic hydrocarbon, must take place at a low temperature. For the same reason the protonization according to this invention must be carried out at a low temperature. A suitable temperature range for the performance of the present process is from about $-100°$ to $+15°$ C., though a temperature from about $-40°$ to $-65°$ C. is preferred.

When these conditions are observed and the preferred reagents and solvents mentioned below are used, it is possible to obtain by the present process very high yields of $\Delta^4$-3-oxosteroid-monoene which may be up to as much as about 85% of the theoretical yield.

The selective saturation of the 1,2-double bond of a $\Delta^{1,4}$-3-oxosteroid-diene may be of considerable importance in steroid chemistry, especially in the synthesis of known or new pharmacologically active substances. When it is desired, for example, to manufacture any one of the know corticoids containing the $\Delta^4$-3-oxo grouping, such as corticosterone, cortisone, hydrocortisone or their substituted derivatives such as 6α-methyl-, 6α-halogen-, 16α-methyl- or 9α-halogen-derivatives from 3-oxo-5α-pregnane compounds by bromination and dehydrobromination, this can be done only via the 2,4-dibromo compound since, as is known, in the monobromination the bromine atom enters the position 2. To manufacture $\Delta^4$-oxopregnene from the 2,4-dibromo compound is, however, complicated since the 2-bromine atom cannot be removed by direct reduction and must first be exchanged for iodine. However, it is possible to manufacture the $\Delta^{1,4}$-3-oxopregnadienes easily and in good yields from 3-oxo-5α-pregnane compounds by bromination in positions 2 and 4 followed by dehydrobromination, for example with collidine. In the past it was not possible to convert, as mentioned above, these dienes satisfactorily into the $\Delta^4$-3-oxo-monoenes. The new process of this invention, now makes it easy to carry out this conversion so that there is a new route available via the $\Delta^{1,4}$-3-oxopregnadienes to the said $\Delta^4$-3-oxopregnenes, which is technically and economically more advantageous than the direct introduction of the 4-double bond into the allopregnane compounds.

To manufacture an agent containing radical anions the preferred procedure is, as mentioned above, the reaction of an alkali metal such as sodium or potassium or especially lithium in an aprotic solvent upon a polycyclic aromatic hydrocarbon, such, for example, as naphthalene, a methylnaphthalene or dimethylnaphthalene, phenanthrene, terphenyl, anthracene, acenaphthene, stilbene, fluoranthrene or especially diphenyl.

As aprotic solvents for forming the radical anions from the said aromatic compounds with an alkali metal there are preferably used open-chain or cyclic ethers, if desired a mixture of such ethers or of such ethers with other aprotic solvents. Particularly suitable are lower aliphatic ethers such as dimethyl ether, diethyl ether, dipropyl ether, dibutyl or diisobutyl ether, ethyleneglycol dialkyl ethers, for example ethyleneglycol dimethyl or diethyl ether, propyleneglycol ethers such as dimethyl- or diethyl-propyleneglycol ether, acetals such as acetaldehyde-dimethyl- or diethyl-acetal, doxan, tetrahydrofuran, tetrahydropyran, methyltetrahydrofurfuryl ether and similar compounds. Particularly useful is tetrahydrofuran. Suitable diluents are, among others, aliphatic or aromatic inert hydrocarbons such as hexane, benzene, toluene or hydroaromatic hydrocarbons such as Tetralin or Decalin.

The preparation of the solution containing the radical anions in the manner described above is best carried out by stirring the mixture consisting of the alkali metal, the aromatic compound and the solvent, advantageously under nitrogen, at room temperature. The metal may be used in small lumps or in finely dispersed form. After having dissolved the metal the solution is cooled to the desired temperature within the range indicated above, the steroid is added and the whole is allowed to react under the same conditions for, for example, about three quarters of an hours. A proton donor, such as water, or the salt of a weak base, or a weak acid, such as ammonium chloride or acetic acid or the like, is added at a low temperature and the $\Delta^4$-3-oxosteroid is isolated in known manner.

The starting materials to be used in the present process are $\Delta^{1,4}$-3-oxosteroid-dienes containing a 10α-methyl or 10β-methyl group, which may display any desired constitution and configuration in the rings B, C and D and may be substituted in any desired manner. More especially in position 17 there may be present the side chain of a cholane, androstane, pregnane, spirostane, cholestane, furostane or cardanolide. Further suitable substituents are, for example, free or functionally modified hydroxyl or oxo groups, that is to say, for example, esterified or etherified hydroxyl groups or ketalized oxo groups, lower alkyls such as methyl groups, mercapto or amino groups. The term steroids as used in this context includes also, for example, 18-norsteroids, C-norsteroids and D-homosteroids.

The starting products are known or can be manufactured in known manner.

The invention includes also any variant of the process in which an intermediate obtained at any stage of the process is used as starting material and any remaining step/steps is/are carried out, or in which a starting material is formed under the reaction conditions.

The following examples illustrate the invention.

Example 1

A mixture of 60 mg. of lithium, 1.2 g. of diphenyl and 20 ml. of tetrahydrofuran is stirred for 2 hours at room temperature. The blue solution is then cooled to −65° C., then 400 mg. of 3-oxo-7α-methyl-17-ethylenedioxy-$\Delta^{1,4}$-androstadiene are added and the mixture is stirred at the same temperature for 45 minutes under nitrogen, then 1 g. of ammonium chloride is added. After 1 hour another 1 g. of ammonium chloride is added and the temperature is allowed to rise to −60° C. within half an hour and then to −40° C. within another half hour. 20 ml. of saturated ammonium chloride solution and water are added to the reaction mixture, which by now has turned light green. The batch is agitated with toluene and washed with dilute sodium chloride solution, and the organic solutions are dried and evaporated under vacuum. The residue is dissolved in 25 ml. of petroleum ether, filtered through 12 g. of alumina (activity II) and the alumina is flushed with 75 ml. of petroleum ether. The column is then eluted with 400 ml. of benzene. The evaporation residue of this fraction consists of 250 mg. of crude 3-oxo-7α-methyl-17-ethylenedioxy-$\Delta^4$-androstene. Crystallization from ether+peptane furnishes 190 mg. of the pure compound melting at 111–111.5° C.

Example 2

A reaction solution prepared as described in Example 1 from 60 mg. of lithium, 1.2 g. of diphenyl and 20 ml. of tetrahydrofuran is cooled to −12° C. and 600 mg. of 3-oxo-7β-methyl-17-ethylenedioxy-$\Delta^{1,4}$ - androstadiene are added. After 1½ minutes 1 g. of ammonium chloride is added and within 1¼ minutes the batch loses its colour. After working up as described in Example 1, there are obtained 200 mg. of pure 3-oxo-7α-methyl-17-ethylenedioxy-$\Delta^4$-androstene.

Example 3

600 mg. of lithium are added to a solution of 12 g. of diphenyl in 200 ml. of tetrahydrofuran and the whole is stirred for 2 hours at room temperature under nitrogen. The batch is cooled to −65° C. and mixed with 4 g. of 3-oxo-11α-hydroxy-20-ethylenedioxy - $\Delta^{1,4}$ - pregnadiene while flushing with 10 ml. of tetrahydrofuran. The batch is stirred for 45 minutes at −65° to −60° C·, mixed with 20 g. of ammonium chloride, and stirred for another 3 hours at this temperature. The reaction mixture, which by then has turned green, is mixed with 200 ml. of saturated ammonium chloride solution and water, agitated with toluene and the organic solutions are washed with dilute sodium chloride solution, dried and evaporated under vacuum. The crystalline residue is repeatedly extracted with a total of 1 litre of petroleum ether and the extracts are filtered through 120 g. of alumina (activity II). The residue of the petroleum ether filtrate remaining on evaporation is dissolved in ethyl acetate and filtered through the same alumina while flushing with 3 litres of ethyl acetate. The ethyl acetate eluate is evaporated under vacuum and the residue crystallized from methylenechloride+ether to furnish 3.35 g. of 3-oxo-11α-hydroxy-20-ethylenedioxy-Δ⁴-pregnene melting at 187–189° C. Optical rotation $[\alpha]_D^{20} = +84°$ (c.=0.450 in chloroform).

We claim:

1. Process for selectively saturating the 1,2-double bond in $\Delta^{1,4}$-3-oxo-steroid-dienes, wherein a $\Delta^{1,4}$-3-oxo-steroid-diene is treated in an aprotic solvent at a temperature from about —100° to +15° C. with an agent containing radical anions which is the reaction product obtained by reacting an alkali metal upon a polycyclic, aromatic hydrocarbon in an aprotic solvent, and the resulting reaction product, which contains the steroid anion of the partial formula

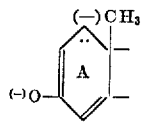

of the ring A, is protonized at a temperature from about —100° to +15° C.

2. Process according to claim 1, wherein the agent containing radical anions is the reaction product obtained by reacting an alkali metal upon a member selected from the group consisting of naphthalene, a methylnaphthalene, a dimethylnaphthalene, phenanthrene, terphenyl, anthracene, acenaphthene, stilbene and fluoranthrene.

3. Process according to claim 1, wherein the agent containing radical anions is the reaction product obtained by reacting an alkali metal upon diphenyl.

4. Process according to claim 1, wherein the agent containing radical anions is the reaction product obtained by reacting lithium upon a polycyclic, aromatic hydrocarbon in an aprotic solvent.

5. Process according to claim 1, wherein the agent containing radical anions is the reaction product obtained by reacting an excess of 2 molecular equivalents of lithium for each molecular equivalent of $\Delta^{1,4}$-3-oxo-steroid-diene upon a polycyclic, aromatic hydrocarbon in an aprotic solvent.

6. Process according to claim 1, wherein the step of forming the steroid anion of the given partial formula is carried out in the temperature range of —100° to +15° C.

7. Process according to claim 1, wherein the protonization of the reaction product containing the steroid anion of the said formula is effected in the temperature range interval of —100° to +15° C.

8. Process according to claim 1, wherein the formation of the sterod anion of the given formula and the protonization of the compound containing such anion are effected at temperatures ranging from —40° to —65° C.

9. Process according to claim 1, wherein the aprotic solvent used is an ether.

10. Process according to claim 1, wherein the aprotic solvent used is a cyclic ether.

11. Process according to claim 1, wherein the aprotic solvent used is tetrahydrofuran.

12. Process according to claim 1, wherein the salt of a weak base is used as proton donor.

13. Process according to claim 1, wherein ammonium chloride is used as proton donor.

References Cited

Legatt et al.: "Chemistry & Industry," February 1962, p. 300 is relied on.

ELBERT L. ROBERTS, Primary Examiner

U.S. Cl. X.R.

260—239.5, 397.2, 397.57